(12) United States Patent
Komlenic et al.

(10) Patent No.: US 7,752,306 B2
(45) Date of Patent: Jul. 6, 2010

(54) NETWORK MANAGEMENT FOR AUTOMATED TELLER MACHINES

(75) Inventors: Todd M. Komlenic, Beaver, PA (US); David W. Householder, Beaver Falls, PA (US); Thomas Tharp, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 228 days.

(21) Appl. No.: 11/703,028

(22) Filed: Feb. 6, 2007

(65) Prior Publication Data
US 2007/0288567 A1 Dec. 13, 2007

Related U.S. Application Data

(60) Provisional application No. 60/808,866, filed on May 26, 2006.

(51) Int. Cl.
*G06F 15/173* (2006.01)

(52) U.S. Cl. ...................................................... 709/224

(58) Field of Classification Search ................. 709/220, 709/201, 219, 217, 218, 249, 238, 232, 224, 709/226, 203, 245; 707/501, 505, 506, 530, 707/513; 715/215, 735, 736, 740; 370/230, 370/231, 232, 352, 389, 229, 254, 360; 705/5, 705/6, 1, 28, 26, 27, 56, 35, 37, 44, 10, 14, 705/30, 7
See application file for complete search history.

(56) References Cited

U.S. PATENT DOCUMENTS

| | | |
|---|---|---|
| 5,185,860 A | 2/1993 | Wu |
| 5,471,617 A | 11/1995 | Farrand et al. |
| 5,592,620 A | 1/1997 | Chen et al. |
| 5,651,006 A * | 7/1997 | Fujino et al. ................. 370/408 |
| 5,802,518 A | 9/1998 | Karaev et al. |
| 5,907,696 A | 5/1999 | Stilwell et al. |
| 6,253,243 B1 | 6/2001 | Spencer |
| 6,292,472 B1 | 9/2001 | Rariden et al. |
| 6,363,421 B2 | 3/2002 | Barker et al. |
| 6,396,845 B1 * | 5/2002 | Sugita ......................... 370/449 |

(Continued)

OTHER PUBLICATIONS

ISR and Written Opinion, PCT/US2007/12449, Apr. 29, 2008.

(Continued)

*Primary Examiner*—Nathan Flynn
*Assistant Examiner*—Mark O Afolabi
(74) *Attorney, Agent, or Firm*—K&L Gates LLP (57) ABSTRACT

Methods of managing a network comprising a plurality of agents. The methods may comprise the step of receiving a periodic status message from each of a first group of agents selected from the plurality of agents The methods may also comprise the steps of querying a router on a local portion of the network positioned to handle communications between components on the local portion of the network and components on a remote portion of the network, and receiving from the router an indication of a second group of agents from the plurality of agents that are communicating through the router. In addition, the methods may comprise the steps of comparing the first group of agents to the second group of agents, and generating a list of agents communicating through the router from which periodic status messages are not being received.

22 Claims, 12 Drawing Sheets

U.S. PATENT DOCUMENTS

| | | |
|---|---|---|
| 6,404,743 B1 | 6/2002 | Meandzija |
| 6,490,617 B1 | 12/2002 | Hemphill et al. |
| 6,697,970 B1 | 2/2004 | Chisholm |
| 6,904,593 B1 * | 6/2005 | Fong et al. .................. 717/171 |
| 7,061,923 B2 | 6/2006 | Dugan et al. |
| 2003/0186689 A1 | 10/2003 | Herle et al. |
| 2003/0217142 A1 | 11/2003 | Bobde et al. |
| 2004/0047324 A1 | 3/2004 | Diener |
| 2004/0083290 A1 * | 4/2004 | Chen et al. .................. 709/227 |
| 2004/0249973 A1 | 12/2004 | Alkhatib et al. |
| 2005/0177642 A1 | 8/2005 | Motoyama et al. |
| 2006/0071776 A1 | 4/2006 | White, II et al. |
| 2006/0072583 A1 | 4/2006 | Sanda et al. |
| 2006/0123477 A1 | 6/2006 | Raghavan et al. |
| 2007/0288545 A1 | 12/2007 | Komlenic et al. |
| 2007/0288554 A1 | 12/2007 | Komlenic et al. |

OTHER PUBLICATIONS

DenHartog, M., "SNMP Tutorial: The Fast Track Introduction to SNMP Alarm Monitoring", Version 1.3, DPS Telecom (Sep. 27, 2004).

Office Action issued in U.S. Appl. No. 11/702,986 mailed Jan. 22, 2009.

Office Action issued in U.S. Appl. No. 11/702,852 mailed Feb. 5, 2009.

Interview Summary issued in U.S. Appl. No. 11/702,986 mailed Jun. 9, 2009.

Interview Summary issued in U.S. Appl. No. 11/702,852 mailed Jun. 9, 2009.

* cited by examiner

| DEVICE ▲ | UPDATED | PRIVATE NET | PUBLIC IP | ADDRESS | STATE | PHONE # |
|---|---|---|---|---|---|---|
| pt0225 (S) | Nov-08 12:29 | 172.27.4.0 | 168.160.133.12 | RFK STADIUM #1 2400 E CAPITOL ST SE WASHINGTON | DC 20003 | 412-651-1869 |
| pt0226 (S) | Nov-08 12:21 | 172.27.4.4 | 168.160.133.13 | RFK STADIUM #2 2400 E CAPITOL ST SE WASHINGTON | DC 20003 | 412-651-1870 |
| pt0228 (S) | Nov-08 12:53 | 172.27.4.12 | 168.160.133.15 | RFK STADIUM #4 2400 E CAPITOL ST SE WASHINGTON | DC 20003 | 412-651-1872 |
| pt0229 (S) | Nov-07 01:56 | 172.27.4.16 | 168.160.133.16 | RFK STADIUM #5 2400 E CAPITOL ST SE WASHINGTON | DC 20003 | 412-651-1873 |
| pt0231 (A) | Jan-16 10:54 | 172.27.4.20 | 168.160.133.45 | MONROEVILLE MALL 235 MONROEVILLE MALL MONROEVIL | PA 15146 | 412-443-3080 |
| pt0232 (S) | Jan-16 10:54 | 172.27.4.24 | 168.160.133.64 | WALNUT CAPITAL - SMALLMAN 1400 SMALLMAN STREET PIT | PA 15222 | 412-651-2745 |
| pt0234 (A) | Jan-16 10:54 | 172.27.4.28 | 168.160.133.39 | COGO #497 - AMBRIDGE 2399 DUSS AVE AMBRIDGE | PA 15003 | 412-337-9943 |
| pt0235 (A) | Jan-16 10:54 | 172.27.4.32 | 168.160.133.36 | COGO #478 - CLINTON 1256 ROUTE 30 CLINTON | PA 15026 | 412-335-5664 |
| pt0236 (A) | Jan-16 10:55 | 172.27.4.36 | 168.160.133.37 | COGO #486 - BEAVER 4760 TUSCARAWAS RD BEAVER | PA 15009 | 412-335-5835 |
| pt0237 (A) | Jan-16 10:53 | 172.27.4.40 | 168.160.133.35 | COGO #1493 - BELLEVUE 620 LINCOLN AVE BELLEVUE | PA 15202 | 412-335-4536 |
| pt0238 (A) | Jan-16 10:55 | 172.27.4.44 | 168.160.133.48 | PNC PARK - CLUB LEVEL 115 FEDERAL STREET PITTSBURGH | PA 15212 | 412-496-6298 |
| pt0239 (S) | Jan-16 10:53 | 172.27.4.48 | 168.160.133.51 | PNC PARK - UPPER LVL 115 FEDERAL STREET PITTSBURGH | PA 15212 | 412-508-0833 |
| pt0240 (S) | Jan-16 10:53 | 172.27.4.52 | 168.160.133.49 | PNC PARK - RIVERWALK 115 FEDERAL STREET PITTSBURGH | PA 15212 | 412-496-6460 |
| pt0242 (A) | Jan-16 10:56 | 172.27.4.56 | 168.160.133.46 | PITT - LITCHFIELD UNIVERSITY OF PGH - LITCHFIELD PITTS | PA 15213 | 412-445-9634 |
| pt0243 (A) | Jan-16 10:55 | 172.27.4.60 | 168.160.133.38 | COGO #494 - BURGETTSTOWN 1100 STEUBENVILLE PIKE BL | PA 15021 | 412-335-0884 |
| pt0244 (A) | Jan-16 10:53 | 172.27.4.64 | 168.160.133.34 | COGO #002 - KITTANNING ROUTES 422 & 66 KITTANNING | PA 18201 | 412-310-6702 |
| pt0246 (A) | Jan-16 10:53 | 172.27.4.68 | 168.160.133.52 | PRIMA #6002 EVANS CITY 342 W MAIN STREET EVANS CIT | PA 16033 | 412-508-4718 |
| pt0247 (A) | Jan-16 10:52 | 172.27.4.72 | 168.160.133.53 | PRIMA #5206 N CASTLE HGHLD 606 HIGHLAND AVE NEW C | PA 16101 | 412-874-7944 |
| pt0249 (A) | Jan-16 10:53 | 172.27.4.76 | 168.160.133.55 | PRIMA #5214 N CASTLE WASH 2015 E WASHINGTON STREE | PA 16501 | 412-651-2735 |
| pt0250 (A) | Jan-16 10:54 | 172.27.4.80 | 168.160.133.54 | PRIMA #5207 N CTLE WLMGTN 2702 WILMINGTON RD NEW | PA 16501 | 412-303-5307 |
| pt0251 (A) | Jan-16 10:54 | 172.27.4.84 | 168.160.133.32 | AR BUILDING CENTRE AVE 4631 CENTRE AVENUE PITTSBU | PA 15232 | 412-369-2917 |
| pt0252 (A) | Jan-16 10:55 | 172.27.4.88 | 168.160.133.41 | COGO #824 - CRANBERRY 20570 RT 19 CRANBERRY TWP | PA 16066 | 412-337-8898 |
| pt0253 (A) | Jan-16 10:55 | 172.27.4.92 | 168.160.133.40 | COGO #821 - WHITE OAK 1513 LINCOLN WAY WHITE OAK | PA 15131 | 412-651-2747 |
| pt0254 (A) | Jan-16 10:55 | 172.27.4.96 | 168.160.133.66 | PSU - HAZELTON 76 UNIVERSITY DR HAZELTON | PA 18201 | 412-651-2747 |
| pt0255 (A) | Jan-16 10:56 | 172.27.4.100 | 168.160.133.65 | KEYSTONE AUTOMOTIVE 44 TUNKHANNOCK MURRAYSVILL | PA 18643 | 412-651-2746 |
| pt0261 (A) | Jan-16 10:54 | 172.27.4.104 | 168.160.133.71 | TRKY HILL - MOOSIC #273 3368 BIRNEY AVE MOOSIC | PA 18507 | 412-651-2752 |
| pt0262 (A) | Jan-16 10:52 | 172.27.4.108 | 168.160.133.69 | TRKY HILL - COOPERSBURG #262 106 S THIRD ST COOPERS | PA 18036 | 412-651-2750 |
| pt0263 (A) | Jan-16 10:52 | 172.27.4.112 | 168.160.133.72 | TRKY HILL - WILKES - BARR #259 616 HAZLE STREET WILKES - | PA 18702 | 412-651-2753 |
| pt0270 (A) | Jan-16 10:55 | 172.27.4.136 | 168.160.133.74 | AMERISOURCEBERGEN 1300 MORRIS DR STE 100 CHESTER | PA 19087 | 412-651-2755 |

| Device ▲ | Last Update | IP Network | Monthly Bytes | Daily Bytes | RSSI | Chan | Ec / Io | CSMA |
|---|---|---|---|---|---|---|---|---|
| 192.168.21.208 | | 166.158.67.69 | 292024 | 292024 | active | | | Unknown |
| 192.168.21.212 | | 166.158.66.89 | 217928 | 217928 | active | | | Unknown |
| 192.168.21.216 | | 166.158.66.90 | 310280 | 310280 | active | | | Unknown |
| 192.168.21.220 | | 166.158.66.91 | 706896 | 706896 | active | | | Unknown |
| 192.168.21.252 | | 166.158.67.56 | 2432264 | 2432264 | ☒ | | | Unknown |
| 192.168.22.68 | | 166.158.66.95 | 384496 | 384496 | active | | | Unknown |
| 192.168.22.72 | | 166.158.66.96 | 9784 | 9784 | ☒ | | | Unknown |
| 192.168.22.76 | | 166.158.66.97 | 21552 | 21552 | ☒ | | | Unknown |
| 192.168.22.80 | | 166.158.66.98 | 20448 | 20448 | ☒ | | | Unknown |
| 192.168.22.84 | | 166.158.66.99 | 22440 | 22440 | ☒ | | | Unknown |
| 192.168.22.88 | | 166.158.66.100 | 23760 | 23760 | ☒ | | | Unknown |
| 192.168.22.92 | | 166.158.66.101 | 24072 | 24072 | ☒ | | | Unknown |
| 192.168.22.96 | | 166.158.66.102 | 22664 | 22664 | ☒ | | | Unknown |
| 192.168.22.100 | | 166.158.66.103 | 22296 | 22296 | ☒ | | | Unknown |
| 192.168.22.104 | | 166.158.66.104 | 23968 | 23968 | ☒ | | | Unknown |
| 192.168.22.108 | | 166.158.66.105 | 22776 | 22776 | ☒ | | | Unknown |

3G WIRELESS ATM  01/16 10:59  |  204 Matric(s)  |  CHART: 14  DAYS  |  Filter: [  ]  [GO] [RESET]  SUMMARY  FAULT  PENDING  STATISTICS  FLOW

| Device | METRIC | LAST | ? | MEAN | MODE | MEDIAN | STDDEV | LOW | HIGH |
|---|---|---|---|---|---|---|---|---|---|
| pl0225 | RSSI | -76 | | -76.32 | -75 | -76 | 1.67 | -80 | -73 |
| pl0225 | ECIO | -8 | | -5.22 | -4 | -5 | 1.45 | -10 | -3 |
| pl0226 | RSSI | -82 | | -81.73 | -82 | -82 | 1.55 | -88 | -68 |
| pl0226 | ECIO | -7 | | -5.26 | -6 | -5 | 1.43 | -12 | -3 |
| pl0227 | RSSI | -60 | | -60.44 | -60 | -60 | 0.90 | -67 | -59 |
| pl0227 | ECIO | -4 | | -4.47 | -5 | -4 | 1.52 | -10 | -2 |
| pl0231 | RSSI | -93 | | -95.09 | -95 | -95 | 3.11 | -102 | -84 |
| pl0231 | ECIO | -7 | | -6.47 | -5 | -6 | 2.92 | -15 | -2 |
| pl0232 | RSSI | -57 | | -58.00 | -58 | -58 | 1.21 | -62 | -55 |
| pl0232 | ECIO | -6 | | -6.03 | -4 | -6 | 1.63 | -11 | -3 |
| pl0234 | RSSI | -88 | | -86.81 | -88 | -88 | 2.21 | -93 | -82 |
| pl0234 | ECIO | -6 | | -5.41 | -6 | -5 | 1.70 | -11 | -2 |
| pl0235 | RSSI | -69 | | -69.76 | -69 | -69 | 2.33 | -80 | -67 |
| pl0235 | ECIO | -3 | | -3.05 | -3 | -3 | 0.83 | -9 | -2 |
| pl0236 | RSSI | -102 | | -100.67 | -101 | -101 | 2.69 | -109 | -94 |
| pl0236 | ECIO | -13 | | -11.97 | -12 | -12 | 2.16 | -25 | -5 |
| pl0237 | RSSI | -80 | | -77.72 | -78 | -78 | 6.90 | -97 | -61 |
| pl0237 | ECIO | -15 | | -13.18 | -14 | -14 | 2.24 | -17 | -7 |
| pl0238 | RSSI | -63 | | -62.79 | -63 | -63 | 0.61 | -68 | -57 |
| pl0238 | ECIO | -6 | | -4.82 | -5 | -5 | 1.04 | -9 | -2 |
| pl0239 | RSSI | -56 | | -58.00 | -57 | -58 | 1.95 | -80 | -56 |
| pl0239 | ECIO | -3 | | -2.91 | -3 | -3 | 0.75 | -11 | -2 |
| pl0240 | RSSI | -62 | | -69.25 | -68 | -68 | 3.50 | -76 | -62 |
| pl0240 | ECIO | -6 | | -4.93 | -5 | -5 | 1.07 | -9 | -3 |
| pl0242 | RSSI | -87 | | -81.11 | -77 | -82 | 3.33 | -90 | -76 |
| pl0242 | ECIO | -7 | | -5.33 | -6 | -5 | 1.61 | -10 | -3 |
| pl0243 | RSSI | -89 | | -92.60 | -94 | -94 | 2.45 | -107 | -87 |
| pl0243 | ECIO | -7 | | -9.55 | -10 | -9 | 2.18 | -21 | -4 |
| pl0244 | RSSI | -65 | | -71.59 | -76 | -72 | 4.57 | -81 | -60 |

NETWORK MANAGEMENT FOR AUTOMATED TELLER MACHINES

CROSS-REFERENCE TO RELATED APPLICATIONS

This application claims the benefit of U.S. Provisional Application No. 60/808,866, filed on May 26, 2006

BACKGROUND

In many computer networks, it is desirable to monitor the status of network agents. For example, a bank having a network of Automated Teller Machines (ATM's) needs to know the status of its ATM's. In the same way, other network operators having remote agents often need to manage their agents for similar reasons. Most of the existing methods for managing networks rely primarily on active polling or pinging of agents. According to these methods, a host machine or machines on the network periodically polls each agent on the network. When an agent receives a poll or ping, it prepares and sends a response message to the host. The host verifies the status of an agent based on whether it replies to the poll and on status data that may be included in the response message. If more information about the status of an agent is required, for, example, if the response message indicates a problem, additional pings or polls may be sent to the agent.

Although active maintenance systems can be effective, they also have certain drawbacks. For example, active maintenance requires a great deal of bandwidth. For every poll or ping to an agent, two messages are carried on the network: the poll or ping and the response message. Bandwidth-related concerns can be particularly troublesome when all or a portion of the network path between a host and an agent is bandwidth limited, or rented on the basis of bandwidth. In addition to its bandwidth issues, active maintenance also is incapable of managing agents that the host does not know about. Each ping or poll made by the host must be directed to the address of an agent. If the host is unaware of any agents on the network, it most likely does not know those agents' addresses and cannot ping or learn anything about them.

SUMMARY

In one general aspect, the present invention is directed to methods of managing a network comprising a plurality of agents. The methods may comprise the step of receiving a periodic status message from each of a first group of agents selected from the plurality of agents The methods may also comprise the steps of querying a router on a local portion of the network positioned to handle communications between components on the local portion of the network and components on a remote portion of the network, and receiving from the router an indication of a second group of agents from the plurality of agents that are communicating through the router. In addition, the methods may comprise the steps of comparing the first group of agents to the second group of agents, and generating a list of agents communicating through the router from which periodic status messages are not being received.

FIGURES

Various embodiments of the present invention are described here by way of example in conjunction with the following figures, wherein:

FIGS. 6, 6A, 7-9, 9A and 9B show screen shots of a user interface according to various embodiments.

DESCRIPTION

Figure 1:
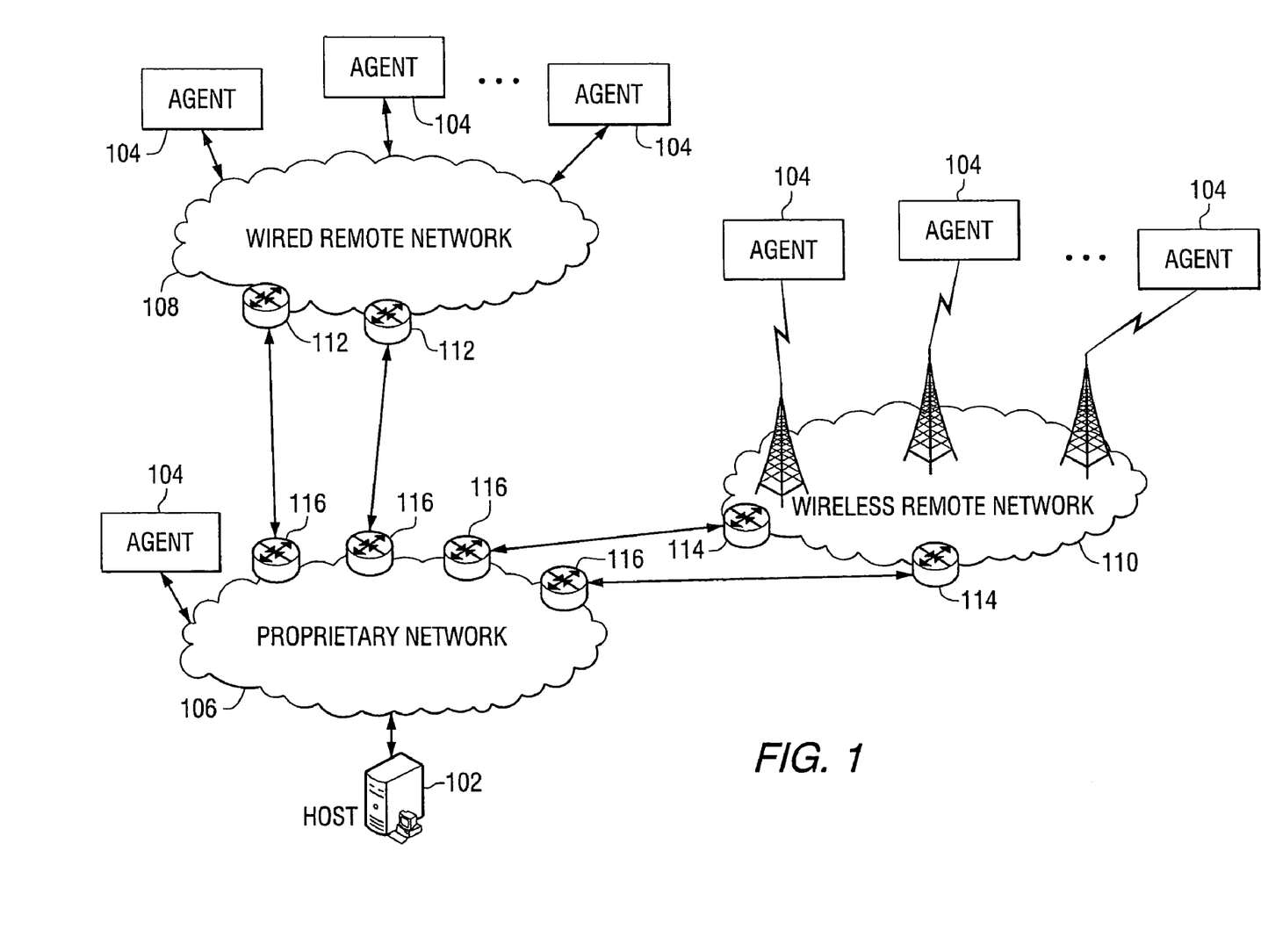
FIG. 1 shows a diagram of a network according to various embodiments.

FIG. 1 shows an exemplary network 100 according to various embodiments. The network 100 may facilitate communication between a host 102 and one or more remote agents 104. The network 100 itself may comprise a proprietary network 106 and various remote networks 108, 110. The proprietary network 106 may include network hardware (e.g., servers, routers, cabling, etc.) that is owned and/or maintained by the individual or organization implementing the network 100 (e.g., a bank or other organization). Components may be connected to the proprietary network 106 according to any suitable wired or wireless method. For example, some components of the wireless network 106 may be connected via connections directly owned or administered by the network administrator while other components may be connected to the network 106 via leased connections provided by a third party. The remote networks 108, 110 may include commercial networks or network access services that allow machines on the proprietary network 106 to access machines beyond the proprietary network 106, (e.g., some agents 104). For example, the remote networks 108, 110 may include the networks of Internet service providers (ISP's), cellular service providers, etc. Access to the remote networks 108, 110 may be purchased, for example, in units of bandwidth, time, periodic access fees, etc. In FIG. 1, remote network 108 is represented as a wired network and remote network 110 is represented as a wireless network. It will be appreciated that remote networks that are mixed wired/wireless networks may also be utilized.

Communication between the host 102 and the agents 104 may be handled by some combination of the proprietary network 106 and the remote networks 108, 110. For example, the host 102 may be able to communicate directly with agents 104 that are resident on the proprietary network 106. For agents 104 that are not resident on the proprietary network 106, the host 102 may be in contact via one or more of the remote networks 108, 110. The proprietary network 106 may be in communication with the remote networks 108, 110, via routers 112, 114, 116. The routers 116 may represent the hardware on the proprietary network 106 where encrypted communications to components on the network 106 terminate. Although the routers 106 are shown at the edge of the proprietary network 106, it will be appreciated that that they may be physically positioned at any point in the network 106.

Figure 2:
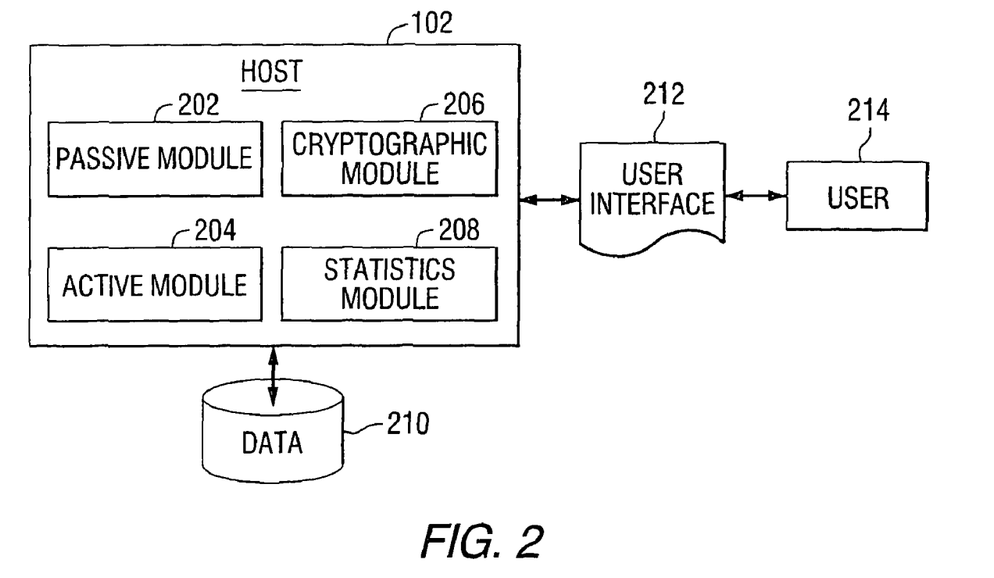
FIGS. 2-3 show diagrams of network components according to various embodiments.

FIG. 2 shows an exemplary diagram, according to various embodiments, of a host 102. The host 102 may include various software modules including a passive module 202, an active module 204, a cryptographic module 206, and a statistics module 208. The functions of the various modules will be described in more detail below. A host data store 210 may be used to store various information related to the network 100 including the agent data files described below. Also, according to various embodiments, the host 102 may provide a user interface 212 to a user 214. The user 214 may be any kind of user including, an administrative user charged with maintaining the network 100 or a portion thereof, a customer or end user, etc. The user interface 212 may allow the user 214 to monitor and/or manipulate the management of the network, for example, as described in more detail below. According to various embodiment, access to the interface 212 may be restricted to credentialed administrative users. The interface 212 may be provided while the user 214 is directly accessing a machine that includes all or part of the host 102, or may be accessed remotely (e.g., from an agent 104). It will be appreciated that the host 102 may be implemented across one or more individual machines.

Figure 3:
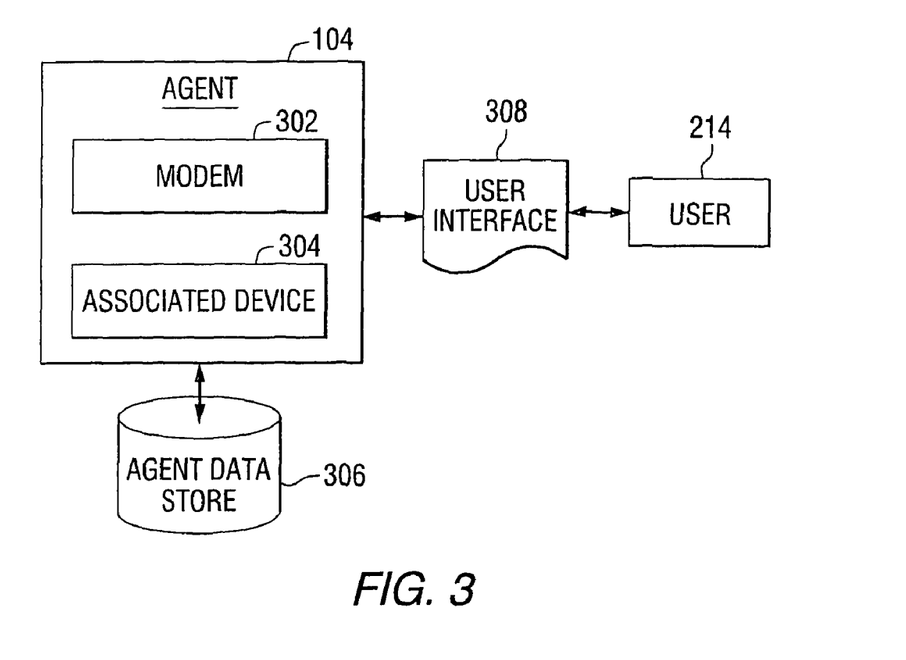

FIG. 3 shows an exemplary diagram, according to various embodiments, of an agent 104. The agent 104 may include various components including, for example, a modem 302, a associated device 304 and an agent data store 306. The modem 302 may allow the agent 104 to communicate on the network 100 via the proprietary network 106, the wired remote network 108, and/or the wireless remote network 110. For example, if the agent 104 is intended to communicate on a wireless network, the modem 302 may include a wireless modem such as a MULTI-SERVICE MODEM (MSM Series) modem available from GLOBAL NET COMMERCE INC. Likewise, if the agent 104 is intended to communicate on a wired network the modem 302 may include an Ethernet or other wired network interface card or unit. Also, the modem 302 may be programmed with various parameters necessary to communicate on the network 100, including the proprietary network 106 and any applicable remote networks 108, 110. For example, the modem 302 may be programmed with various encryption keys, network addresses, etc.

The associated device 304 may be any type of device that serves a useful purpose on the network 100. For example, when the proprietor of the network 100 is a bank, the associated device 304 may be an ATM. According to other various embodiments, the associated device 304 may be an e-mail kiosk, parking pay-station, remote ticket distributor, etc. An agent data store 306 may be used to store various data about the agent 104 including, for example, data related to the agent's connectivity on the network 100, data related to the functionality of the associated device 304, etc. According to various embodiments, the agent 104 may provide a user interface 308 to a user 214. The interface 308 may serve various purposes. For example, the interface 308 may allow the user 214 to troubleshoot problems with the agent 104. In addition, the interface 308 may allow the user 214 access to services provided by the associated device 304 (e.g., banking services, vending services, etc.).

According to various embodiments, each agent 104 may be configured to send an unsolicited status message or trap to the host 102 at a given interval (e.g., every 5 minutes). This may be accomplished according to various methods. For example, some agents 104 may include dedicated processors that send the periodic status messages. Some agents 104 may also include modems 302 that can be configured to send periodic status messages by manipulating the modem's firmware settings. The status messages themselves may be configured according to any suitable communication protocol including, for example, Simple Network Management Protocol (SNMP). Status messages may include a name of an agent 104 and/or another identifiable indication that the particular agent 104 is active. According to various embodiments, the status messages may also include information about the status of an agent 104. For example, in an embodiment where the agent is configured to operate on a wireless network, a status message may include an indication of Received Signal Strength Indication (RSSI), pilot signal to interference ratio ($E_C/I_O$), channel, Ethernet status, etc. Where the agent is configured to operate on a wired network, status messages may include various other status information about wired connections including, Ethernet status, etc.

Figure 4:
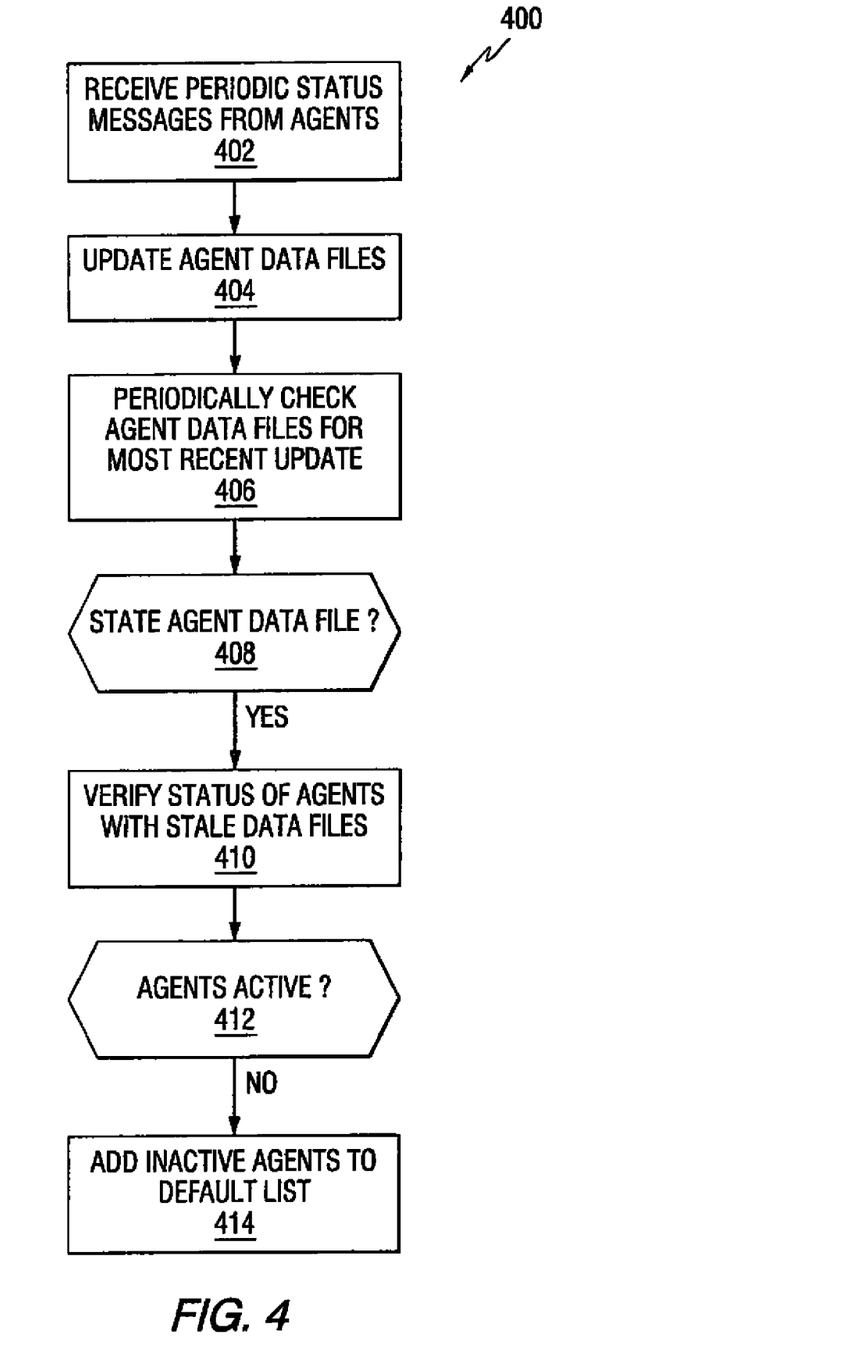
FIGS. 4-5 show process flows according to various embodiments.

FIG. 4 shows a process flow 400, according to various embodiments, for passively managing agents 104 on the network 100. At step 402, the host 102 may receive periodic status messages from agents 104 on the network 100. According to various embodiments, the host 102 (e.g., via the passive module 202) may maintain a log or data file for each configured agent 104 (e.g. at host data storage 210). The data file may include a record of status messages received from a corresponding agent and an indication of any status information included in the messages. The agent data files may be created manually when an agent 104 is set up on the network, or may be created automatically by the host 102 when a first status message is received from an agent. At step 404, the host 102 (e.g., the passive module 202) may update the agent data files based on received status messages. It will be appreciated that steps 402 and 404 may be performed continuously and/or simultaneously as status messages are received by the host 102.

At step 406, the host 102 (e.g., via the passive module 202) may make periodic checks of all of the agent data files to determine if any agent data files are stale. The periodic checks of agent data files may be made at any suitable time interval including, for example, every two minutes. An agent data file may be stale if the host 102 has not received a status message from the agent 104 within a given time period (e.g., ten minutes). If any agent data files are stale at decision step 408, then the status of agents 104 with stale data files (e.g., stale agents) may be verified at step 410 (e.g., by the active module 207 of the host 102). The host 102 may verify the status of a stale agent 104 according to any suitable method or test. For example, the host 102 may actively ping the agent 104 for a predetermined amount of time. Also, in various embodiments, the host 102 may attempt to initiate a Trivial File Transfer Protocol (TFTP), telnet or other session with the host 102.

If the host is able to verify that an agent 104 is active, then the host's data file may no longer be considered stale. If the host 102 is unable to verify that an agent 104 is active, then that agent may be placed in a default list at step 414. The default list, which may be stored, for example, at the host data store 210, may indicate agents 104 that are not active or are experiencing communication problems. According to various embodiments, certain agents 104 maybe added to the default list even if the host 102 is able to verify that they are active. For example, if a particular agent 104 has failed to send status messages at the proper interval more than a predetermined number of times, or more than a predetermined number of times over a given time period, then it may be considered in default even if it responds to a ping or other activity test. Also, agents 104 that have a status parameter or parameters outside of predetermined thresholds, as described below, may be added to the default list. The default list may be stored, for example, at host data store 210. According to various embodiments, the host 102 may present the default list to a user 214, for example, via user interface 212.

It will be appreciated that according to the process flow 400, status messages may be generated and sent by the agents 104 automatically, without any active pings or polls from the host 102. Active pings or polls may be sent by the host 102 when it has failed to receive appropriate status messages from an agent 104. Accordingly, the volume of communication on the network 100 and consequently the bandwidth requirements may be less than that of traditional poll-based methods. Also, as shown by FIG. 1, communications between the host 102 and many of the agents 104 may traverse the remote networks 108 and 110. Because access to these remote networks 108, 110 is often purchased based on bandwidth, the reduced bandwidth of the method may result in substantial cost savings. Also, the reduced bandwidth may facilitate wireless connections in the network path, where excessive bandwidth may be unavailable or very expensive.

In addition to monitoring the status of agents 104 that are configured to send periodic status messages, the host 102 may also detect all agents 104 that are communicating across the proprietary network 106. According to various embodiments, communications on the network 100 may be encrypted. For example, portions of the network 100 may be publicly accessible (e.g., remote networks 106, 110) and/or connected to the Internet. As a result, devices other than those authorized to communicate on the network 100 may be in contact with network devices. Encryption may allow network devices to communicate with one another securely without interference from other devices. For example, only agents 104 or hosts 102 having proper cryptographic keys may be able to send and receive secure communications.

Figure 5:
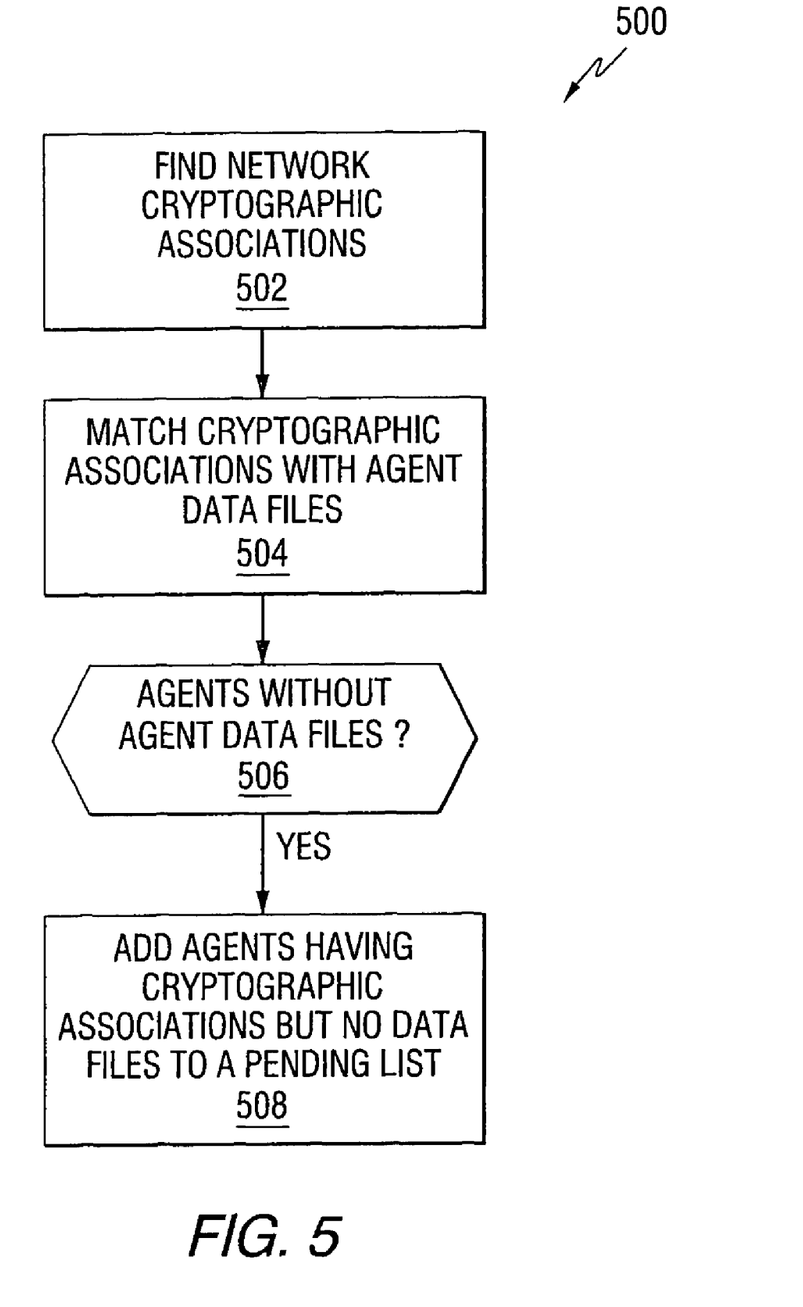

FIG. 5 shows a process flow 500 for detecting agents 104 that are active on the network 100, including agents 104 that are not configured to send periodic status messages. At step 502, the host 102 (e.g., via the cryptographic module 206) may find the current cryptographic associations of the network 100. This may be accomplished by polling the proprietary network routers 116. In response, the routers 116 may provide a list of all agents 104 that have passed an encrypted communication through one or more of the routers 116 over a given time period (e.g., cryptographic associations). The cryptographic associations may include various information about the agents 104 including, for example, their public and private Internet Protocol (IP) addresses, the number of encrypted packets sent and/or received, the subnet mask, etc. It will be appreciated that the proprietary network routers 116 may facilitate communication with the remote networks 108, 110 as well as with any agents 104 present on the proprietary network 106. Accordingly, any agent 104 communication directed to any device on the proprietary network 106 may pass through at least one of the routers 116. As a result, the list of cryptographic associations may be a good indication of all of the agents 104 that are active on the network 100.

Referring back to the process flow 500, at step 504, the host 102 (e.g., via the cryptographic module 206) may match the cryptographic associations with known agents 104 that are sending periodic status messages (e.g., those agents 104 that have an active agent data file). According to various embodiments, cryptographic association data may be organized by public and private IP addresses, while the agent data files may be kept based on agent names. Accordingly, matching cryptographic associations with agent data files may involve the use of Domain Name Server (DNS) functionality to convert IP addresses to their corresponding agent names or visa versa. It will be appreciated that the DNS functionality may be configured to translate IP addresses to agent names, and/or to translate agent names to IP addresses.

There may be some agents 104 on the network that are not configured to send periodic status messages and/or do not have an active agent data file. These agents 104 may not have a name associated with their IP address(es). If any such agents are found at decision step 506, then they may be added to a pending list at step 508. The pending list may include a listing of all agents 104 that are active on the network 100, but are not sending periodic status messages as described above. The pending list may be provided to a user 214, for example, via user interface 212. The user 214 may utilize the pending list to prepare and/or configure agents 104, for example, as described below. According to various embodiments, an agent 104 may be automatically removed from the pending list when the host 102 receives a first status message from the agent 104.

FIGS. 6, 6A, 7-9, 9A and 9B show shots of a series of screens that may be provided to a user 214 via the user interface 212. FIG. 6 shows a view of a screen 600 configured to display information regarding all agents 104 that are sending periodic status messages. It will be appreciated that the screen 600 may be arranged according to any suitable configuration. For example, as shown in FIG. 6, the screen 600 is arranged into a series of columns and rows with each row corresponding to a single agent 104 and each column including a piece of information about the agents 104.

Column 602 lists agent names. Column 604 lists the date and time when the most recent status message was received from each agent 104. Column 606 may show the public IP address of each agent 104. Another embodiment of the screen 600, shown in FIG. 6A, includes an additional column 609 for the private IP address of the agents 104. Referring back to FIG. 6, columns 610 and 612 may list addresses, states and zip codes indicating agent 104 locations. It will be appreciated that these fields may be omitted for agents 104 that are not at a fixed location. Column 614 may list agent 104 phone numbers. An agent 104 may have a phone number, for example, when it is configured to communicate on a wireless remote network, such as 108, and the wireless remote network is a cellular service provider. The phone number may represent an agent's address on the remote network. Columns 616, 618, 620 and 622 may show various status information included in status messages received from the agents 104 including, for example, Received Signal Strength Indication (RSSI), pilot signal to interference ratio ($E_c/I_o$), channel, Ethernet status, etc. For agents that are in default, the parameter causing the default may be highlighted. For example, if an agent's entry in column 604 is highlighted, as shown at field 615, then the host 102 may not have received a status message from that agent for more than the predetermined time period.

Figure 7:
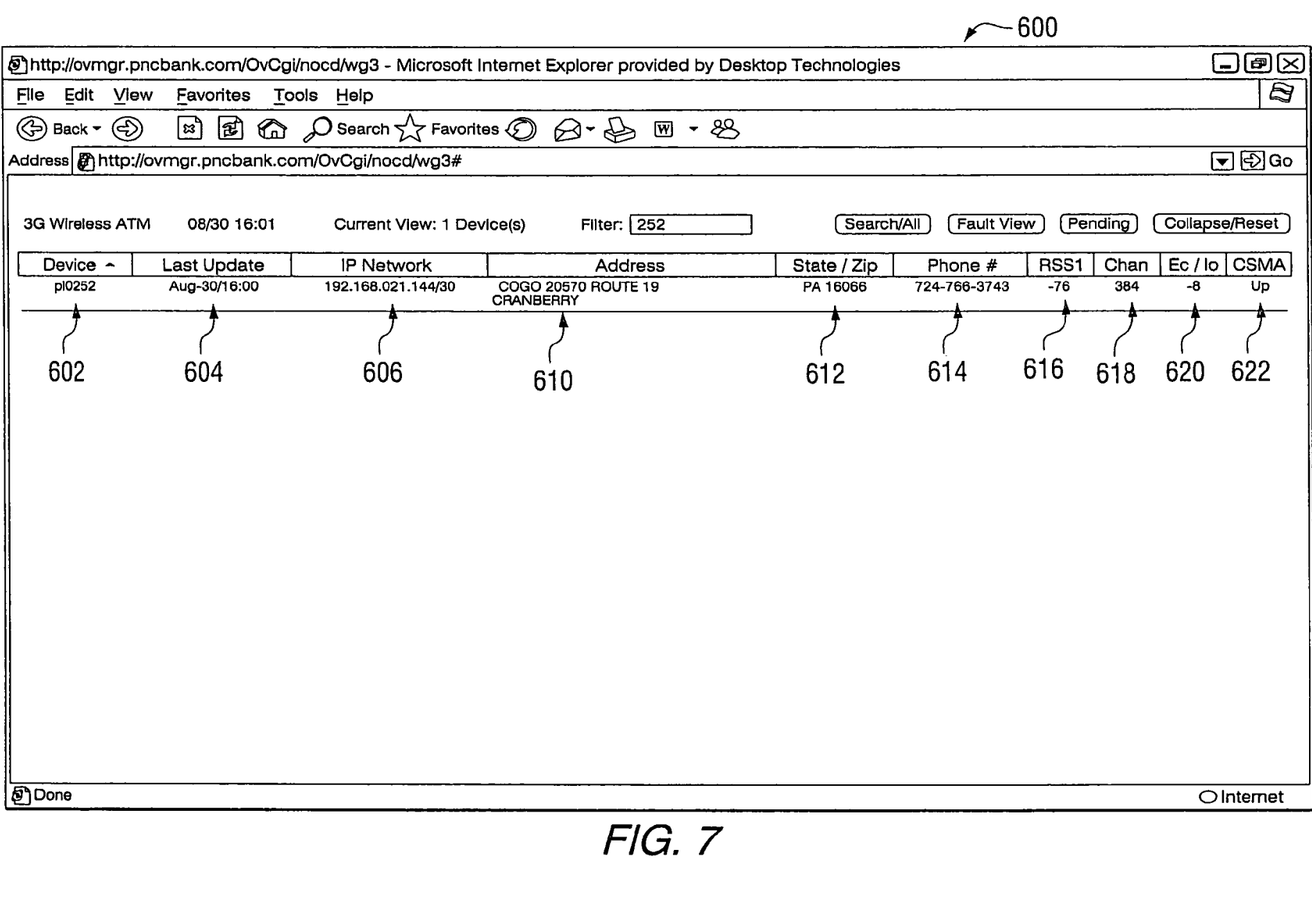

The screen 600 may also include buttons 625, 627, 629 that allow a user 214 to configure the screen to display various other information. For example selecting Search All button 625 may cause the screen to appear as shown in FIG. 6. Selecting the Fault View button 627 may cause the screen to display the default list of agents, for example, as shown in FIG. 7. Each row, as shown in FIG. 7, may represent an agent 104 that is in default. It will be appreciated that the host 102 may not have received a current status message from an agent 104 in default, and therefore, not all of the fields 616, 618, 620, 622 may be populated for all defaulted agents 104. According to various embodiments, the screen 600 may include a button (not shown) that allows a user 214 to initiate an activity test for a particular agent 104, for example, as described above with respect to step 412.

Figure 8:
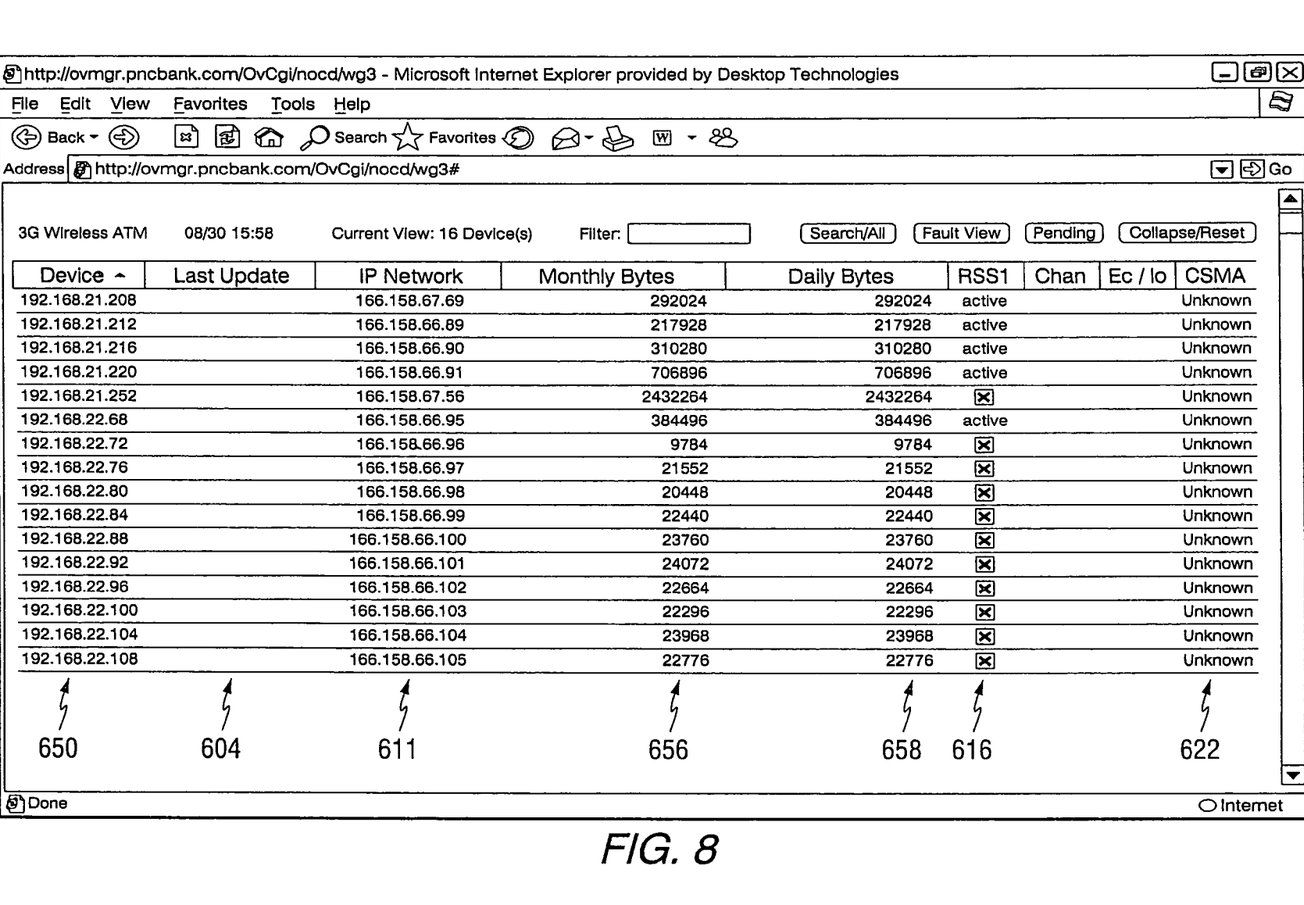

The screen 600 may also be configured to display the pending list, as shown in FIG. 8, for example, by selecting the button 629. The pending list may include columns and rows similar to FIG. 6. Column 650 may list a device identifier for each agent 104 on the pending list. Because agents on the pending list may not have been assigned a device name yet, the identifier shown in column 650 may be an IP address, such as the public IP address shown. Column 611 may show the private IP address for each host. Fields 656 and 658 may respectively show the monthly and daily byte traffic to and from each agent 104. Columns 604 for last status message received and 616, 618, 620, and 622 for agent status information may be blank, as shown in FIG. 8. This is because most agents 104 appearing on the pending list have not yet been configured to send the host 102 status messages that would include this information.

Figure 9:
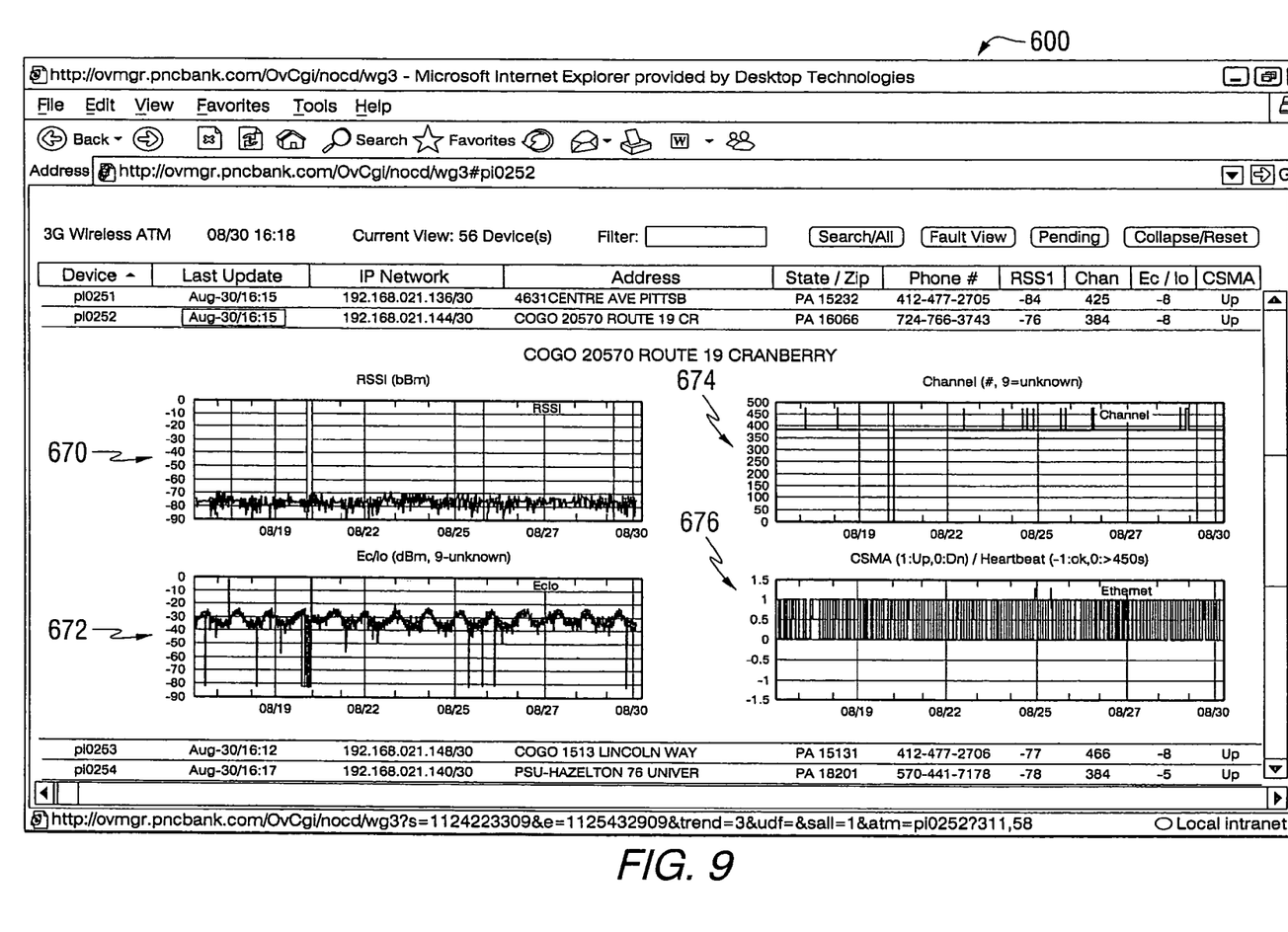

According to various embodiments, agents 104 listed in the screen 600 may be selected and additional data regarding those agents may be displayed, for example, as shown in FIG. 9. The additional data may include graphs of historical reports of RSSI (field 670), Ec/Io (field 672), Channel (field 674) and CSMA (field 676). This data may be helpful to the user 214 in determining the status of the displayed agent 104.

The screen 600 may also include another configuration (not shown) for listing inactive devices. Inactive devices may be devices that are to be taken out of service for business, rather than technical reasons. For example, when the network 100 is implemented by a bank, inactive devices may include those ATM's that are to be relocated or shut-down.

Figure 9B:
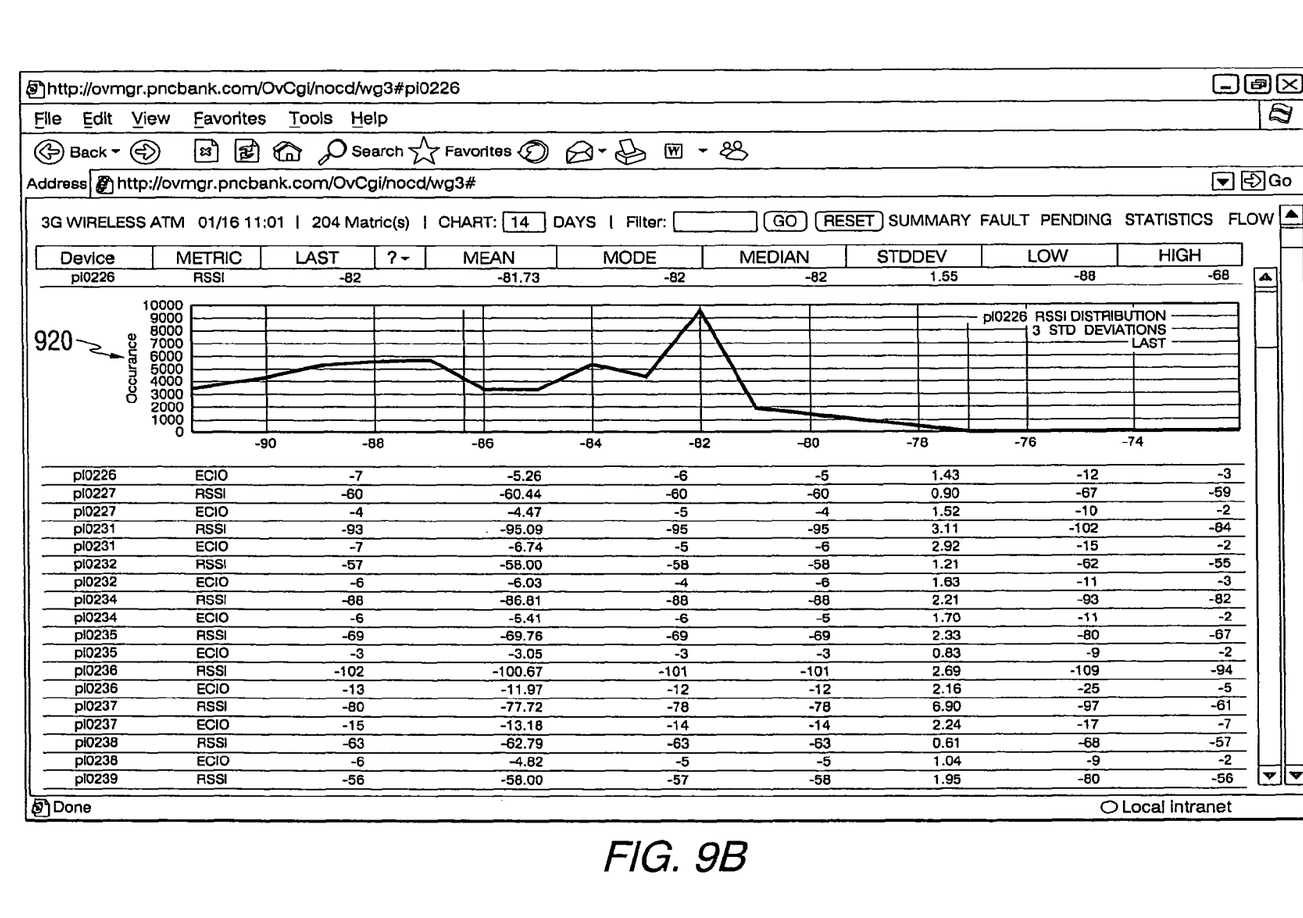

According to various embodiments the host 102 may also be configured to perform various statistical analyses of current and historical data received from the agents 104 (e.g., via statistics module 208). The data may have been received from the hosts 104 through current and historical status messages, and may be stored at agent data files. FIG. 9A shows a screen 900 for listing various parameters of agents 104. Each row of the screen 900 includes statistical information about a single metric of an agent 104. For example, column 902 lists the name of a relevant agent 104. Column 904 lists the agent metric to be described in a row. Column 906 shows the last value of the metric, (e.g., derived from the last status message received from the agent 104 listed in column 902). Columns 908, 910, 912 and 914 respectively list the mean, mode and median value and standard deviation of the metric over a predetermined time period. A low and high value of the metric for the time period is listed at column 918. A graph 920 of a given metric may be displayed as shown in FIG. 9B.

In addition to, or instead of being made available for review by screen 900, statistical data about agents 104 may be used to monitor agents 104 and troubleshoot potential problems. According to various embodiments, the statistics module 208 may implement dynamic threshold checking on an agent-by-agent basis. It will be appreciated that for different devices, different values of data quantities (e.g., RSSI, Ec/Io, Channel, Ethernet Status, etc.) may indicate an agent failure. Accordingly, the statistics module 208 may generate agent-specific failure thresholds for determining when a particular agent 104 or type of agent 104 has failed. To create agent-specific failure thresholds, historical data from one or more of the agents 104 may be analyzed and distribution properties may be calculated for one or more data quantities. For example, if the distribution of a data quantity over time is normal, then a mean and standard deviation may be found. An agent-specific failure threshold may then be found based on the distribution. For example, if the distribution is normal, the threshold may be exceeded if the current value of the data quantity is more than three standard deviations from the mean value. If the distribution is not normal and/or conforms to a different type of distribution, then other statistical or mathematical techniques as known in the art may be used to develop the thresholds. When an agent 104 meets or exceeds a threshold, it may be added to the default list described above.

According to various embodiments, the statistics module 208 may also have functionality for predicting agent 104 failures before they occur. For example, upon failure of an agent 104 in the wireless network, current and/or historical data regarding the failed agent 104 (e.g., RSSI, Ec/Io, Channel, Ethernet Status, etc.) may be saved as a failure profile. The current and/or historical status data of active agents 104 may then be compared or correlated to the failure profile. Agents 104 having current and/or historical data that correlates highly to the failure profile may be in danger of failure themselves. In various embodiments, failure profiles from multiple failed wireless devices may be aggregated to form master failure profiles. Also, in various embodiments, failure profiles may be categorized based on the type of failure experienced. In this way, specific failure types may be predicted by correlating the data of active devices to a given type of failure profile. The host 102 may handle agents 104 with predicted future failures according to any suitable method. For example, these agents 104 may be added to the default list. According to various embodiments, the agents 104 may be added to a separate list of agents 104 with a high risk of failure.

According to various embodiments, the host 102 may include additional functionality that may be of use to a user 214. For example, according to various embodiments, the host 102 may include functionality for pushing common configuration parameters to pending agents 104 (e.g., agents 104 that are communicating on the network but have not yet been configured to send periodic status messages). Implementing push to production functionality may cause common configuration parameters to be sent to all pending agents 104, which may advance or complete their configuration. In various embodiments, a user 214 may implement push to production functionality by activating a button on the "Pending" view of screen 600 shown above. After receiving the common configuration parameters, the agents 104 may begin sending periodic status messages. In various embodiments, when the first status message is received from an agent 104, it may be automatically removed from the pending list, for example, according to process flows 400 and 500 above.

Also, the host 102 may be configured to capture the current system logs (syslog) of one or more agents 104. The syslog of an agent may indicate historical data regarding the agent 104 and/or more detailed information regarding the agent's status. Also, the host 102 may include functionality to allow an operator to manage firmware on the agents 104. For example, the operator may upgrade the firmware on one or more agents 104 (e.g, for modems 302, associated devices 304, etc.) track firmware versions, track firmware performance, etc.

The host 102 may additionally include functionality for pushing parameters to individual agents 104. For example, instead of pushing common configuration parameters, as described above with respect to the push to production functionality, the user 214 may select any available parameter and push it to one, several or all agents 104, for example, concurrently. This may allow the user 214 to configure one or a few pending agents 104 individually.

Figure 10:
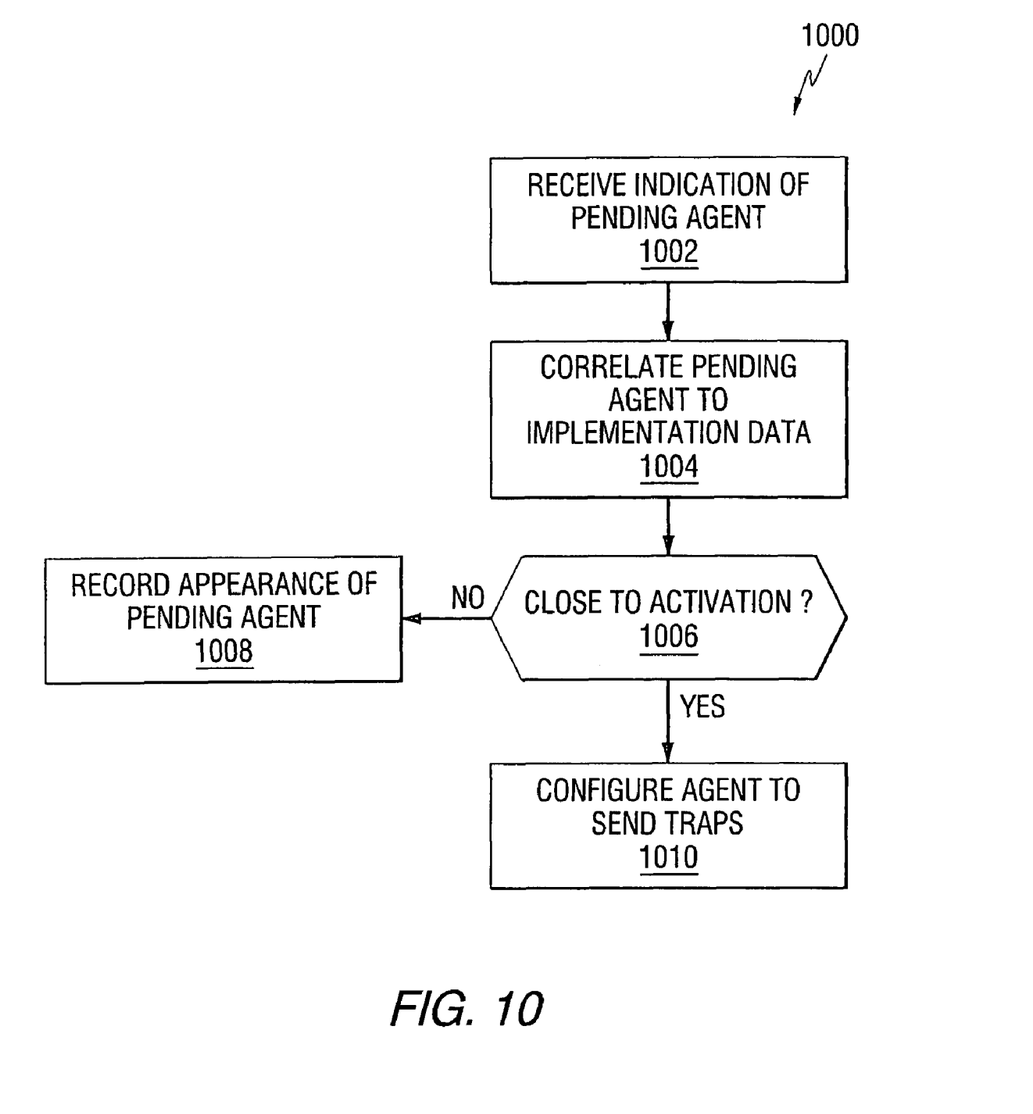
FIG. 10 shows a process flow according to various embodiments.

The systems and methods described above may be used to manage new agents 104 being brought onto the network 100. FIG. 10 shows a process flow 1000 for bringing an agent 104 onto the network 100. At step 1002, an indication of a new pending agent 104 may be received. For example, the new pending agent 104 may be listed in the pending agent list described above. The new pending agent 104 may appear on the pending agent list for a variety of reasons. For example, the new pending agent 104 may be a newly installed ATM, kiosk or other device that is ready to be activated on the network 100. Also, the modem 302 of an agent 104 or the complete agent 104 may be tested before assembly and/or installation. During this testing, the modem 302 or agent 104 may appear on the network 100 and consequently on the pending agent list as a new agent 104. Accordingly, not all new pending agents 104 are ready to be finally configured.

Referring back to the process flow 1000, at step 1004, it may be determined whether a new pending agent 104 is ready to be configured by comparing the new pending agent 104 to implementation data. The implementation data may include a list of agents and a target date for when they will be activated on the network 100. The activation date of an agent may be driven by business considerations (e.g., when a new ATM or kiosk is required, how soon it can be assembled and placed, etc.). If, at decision step 1006, the new pending agent 104 has appeared on the pending agent list near its scheduled activation date (e.g., within a few days), then the new pending agent 104 may be configured to send periodic status messages at step 1010. If the new pending agent 104 has appeared on the pending agent list at a time not near its scheduled activation time, this may indicate that the new pending agent 104 is only being tested or is not otherwise ready to be configured on the network 100. In that case, its appearance may be recorded at step 1008. According to various embodiments, the pending agent 104 may then be deleted from the pending agent list.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

As used herein, a "computer," "computer system," and the like, may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, a virtual computer system and/or any other computerized device or construct capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The described systems may include various modules and/or components implemented as software code to be executed by a processor(s) of the systems or any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives (referred to herein as "computer-readable storage media"). A computer-readable medium may also include memory storage that can be physical, virtual, permanent, temporary, semi-permanent and/or semi-temporary (also referred to herein as "computer-readable storage media"). A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

We claim:

1. A method of managing a network comprising a plurality of agents, wherein each of the plurality of agents is associated with at least one automated teller machine (ATM), the method comprising:

receiving a periodic status message from each of a first group of agents selected from the plurality of agents according to a predetermined schedule;

querying a router on a local portion of the network positioned to handle communications between components on the local portion of the network and components on a remote portion of the network;

receiving from the router an indication of a second group of agents from the plurality of agents that are communicating through the router, wherein the second group of agents comprises agents selected from the plurality of agents that are also part of the first group of agents;

comparing the first group of agents to the second group of agents; and based on the comparing, generating a list of agents communicating through the router from which periodic status messages are not being received, wherein the list of agents comprises agents that are included in the second group of agents, but not in the first group of agents.

2. The method of claim 1, wherein generating the list of agents communicating through the router from which periodic status messages are not being received comprises identifying agents included in the second group of agents and not the first group of agents.

3. The method of claim 1, wherein the second group of agents comprises agents that are passing encrypted communications through the router.

4. The method of claim 1, wherein the indication of the second group of agents comprises, for each agent, a private internet protocol (IP) address and a public IP address.

5. The method of claim 4, wherein identifying agents communicating through the router from whom periodic status messages are not being received comprises matching at least one of the private IP address and the public IP address to an agent name.

6. The method of claim 1, further comprising:

storing a plurality of agent data files, wherein each of the agent data files corresponds to a first group of agents selected from the plurality of agents;

upon receiving a status message from a first agent, updating an agent data file corresponding to the first agent;

periodically identifying agent data files from the plurality of agent data files that have not been updated for a predetermined amount of time; and sending a request for response to a second agent corresponding to an agent data file that has not been updated for a predetermined amount of time.

7. The method of claim 1, further comprising compiling a list of pending agents communicating through the router from whom periodic status messages are not being received.

8. The method of claim 1, further comprising pushing configuration profiles to the agents communicating through the router from whom periodic status messages are not being received, wherein the configuration profiles configure the agents to send periodic status messages.

9. A computer system for managing automated teller machines (ATM's), the system comprising:
- a plurality of agents, wherein each of the plurality of agents is associated with at least one ATM;
- a router positioned on a local portion of the network and positioned to handle communications between components on the local portion of the network and components on a remote portion of the network; and
- a host in communication with the plurality of agents via a network, wherein the host is configured to
  - receive a periodic status message from each of a first group of agents selected from the plurality of agents according to a predetermined schedule;
  - query the router for an indication of a second group of agents from the plurality of agents that are communicating through the router, wherein the second group of agents comprises agents selected from the plurality of agents that are also part of the first group of agents;
  - compare the first group of agents to the second group of agents; and
  - based on the comparison, generate a list of agents communicating through the router from which periodic status messages are not being received, wherein the list of agents comprises agents that are included in the second group of agents, but not in the first group of agents.

10. The computer system of claim 9, wherein the host is further configured to generate the list of agents communicating through the router from which periodic status messages are not being received by identifying agents included in the second group of agents and not the first group of agents.

11. The computer system of claim 9, wherein the second group of agents comprises agents that are passing encrypted communications through the router.

12. The computer system of claim 9, wherein the indication of the second group of agents comprises, for each agent, a private internet protocol (IP) address and a public IP address.

13. The computer system of claim 12, wherein identifying agents communicating through the router from whom periodic status messages are not being received comprises matching at least one of the private IP address and the public IP address to an agent name.

14. The computer system of claim 9, wherein the host is further configured to:
- store a plurality of agent data files, wherein each of the agent data files corresponds to a first group of agents selected from the plurality of agents;
- upon receiving a status message from a first agent, update an agent data file corresponding to the first agent;
- periodically identify agent data files from the plurality of agent data files that have not been updated for a predetermined amount of time; and
- send a request for response to a second agent corresponding to an agent data file that has not been updated for a predetermined amount of time.

15. The computer system of claim 9, wherein the host is further configured to compile a list of pending agents communicating through the router from whom periodic status messages are not being received.

16. The computer system of claim 9, further comprising pushing configuration profiles to the agents communicating through the router from whom periodic status messages are not being received, wherein the configuration profiles configure the agents to send periodic status messages.

17. A computer readable medium having instructions stored thereon that when executed by a processor, cause the processor to perform the steps of:
- receiving a periodic status message from each of a first group of agents selected from a plurality of agents according to a predetermined schedule, wherein each of the plurality of agents is associated with at least one automated teller machine (ATM);
- querying a router on a local portion of the network positioned to handle communications between components on the local portion of the network and components on a remote portion of the network, wherein the second group of agents comprises agents selected from the plurality of agents that are also part of the first group of agents;
- receiving from the router an indication of a second group of agents from the plurality of agents that are communicating through the router;
- comparing the first group of agents to the second group of agents; and
- based on the comparing generating a list of agents communicating through the router from which periodic status messages are not being received, wherein the computer readable medium is a tangible article.

18. The computer readable medium of claim 17, wherein generating the list of agents communicating through the router from which periodic status messages are not being received comprises identifying agents included in the second group of agents and not the first group of agents.

19. The computer readable medium of claim 17, wherein the second group of agents comprises agents that are passing encrypted communications through the router.

20. The computer readable medium of claim 17, wherein the indication of the second group of agents comprises, for each agent, a private internet protocol (IP) address and a public IP address.

21. The computer readable medium of claim 20, wherein identifying agents communicating through the router from whom periodic status messages are not being received comprises matching at least one of the private IP address and the public IP address to an agent name.

22. The computer readable medium of claim 17, further comprising instructions that when executed by the processor, cause the processor to perform the step of:
- storing a plurality of agent data files, wherein each of the agent data files corresponds to a first group of agents selected from the plurality of agents;
- upon receiving a status message from a first agent, updating an agent data file corresponding to the first agent;
- periodically identifying agent data files from the plurality of agent data files that have not been updated for a predetermined amount of time; and
- sending a request for response to a second agent corresponding to an agent data file that has not been updated for a predetermined amount of time.

* * * * *